United States Patent Office 2,859,764
Patented Nov. 11, 1958

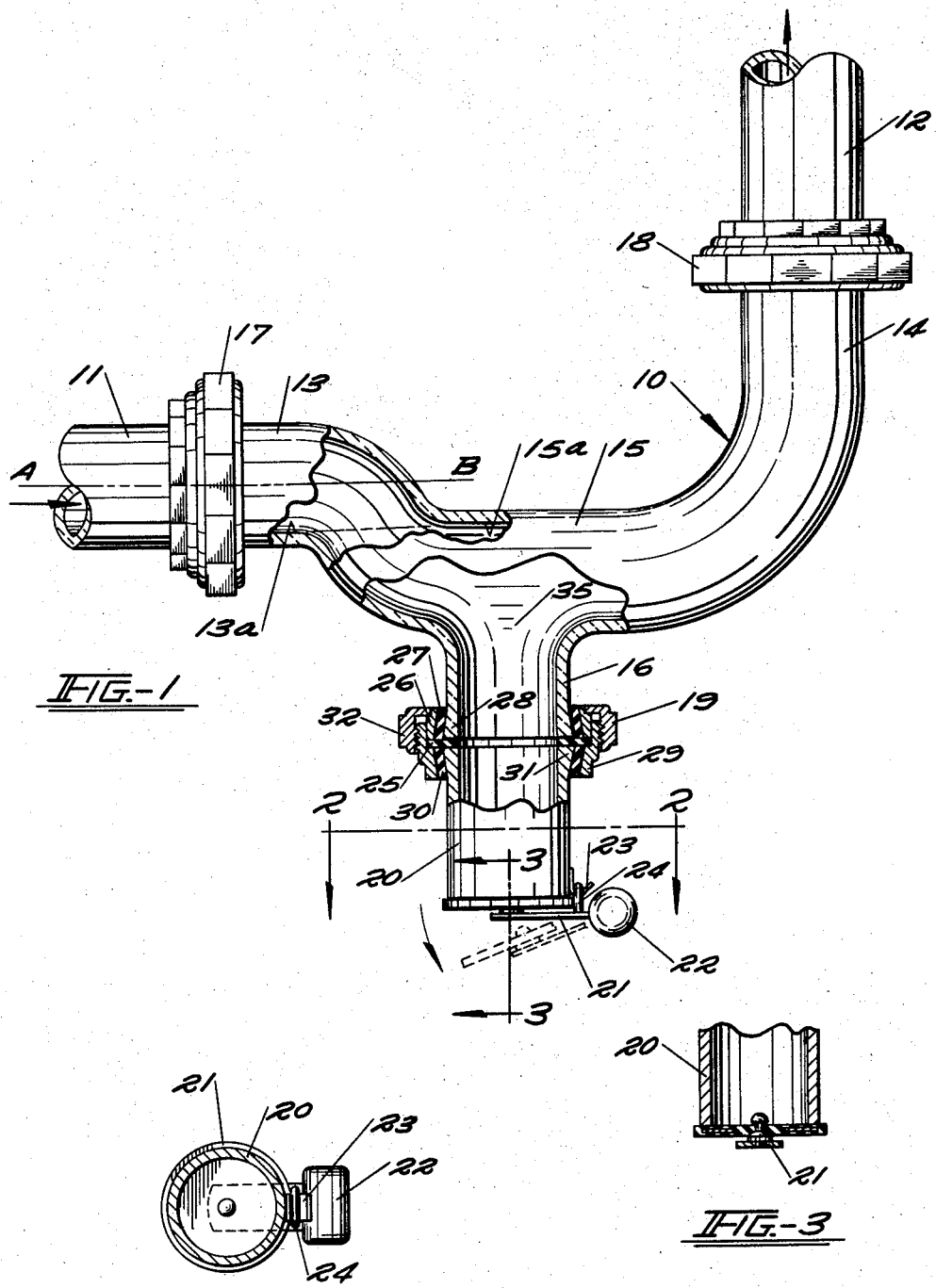

2,859,764

NON-CHURNING MILK LINE ELBOW

Donaven E. Golay, Cambridge City, Ind., assignor to Farmer Feeder Company, Inc., Cambridge City, Ind.

Application June 17, 1957, Serial No. 666,200

2 Claims. (Cl. 137—204)

This invention relates to a milk line pipe fitting in the general nature of an elbow.

The invention has several objects, the primary ones of which are to avoid churning of the milk at the junction of a more or less horizontally disposed pipe line and a vertically ascending pipe line, in addition to avoiding rancidity of the milk due to sloshing back and forth in the presence of air when there is not sufficient milk in the pipe line to fill it and the milk starts up the vertical branch of the line in part only to drop back and be swished back and forth in that manner.

A further important object of the invention is to provide a chamber which will not only be filled before the milk will be elevated in the vertical branch of the line, but also may be quickly rinsed and washed to maintain a sanitary condition in the line and in the fitting particularly.

These and many other objects and advantages of the invention will become apparent to those versed in the art in the following description of one particular form of the invention as illustrated in the accompanying drawing, in which Fig. 1 is a view in side elevation and partial section of a structure embodying the invention;

Fig. 2 is a view in horizontal section on the line 2—2 in Fig. 1; and

Fig. 3 is a detail in vertical section on the line 3—3 in Fig. 1.

As above indicated, the invention embodies a fitting which may be termed generally an elbow designated by the numeral 10. It may be made out of any suitable material either metal, plastic, but preferably glass and so formed as to its ends to provide means for employing sanitary fittings to interconnect the elbow with other parts of the milk line, herein shown as a more or less horizontally run of pipe 11 and a vertically disposed pipe line 12.

The elbow 10 has a rather short horizontally disposed nipple 13 at one end thereof and a vertically disposed nipple 14 at the other end. Between those two nipples 13 and 14, there is a horizontal length 15 whose center is below the center line AB of the horizontal nipple 13 and the horizontal line 11, the axis of this portion 15 being not only parallel to the line AB, but also being sufficiently lowered to have the extreme upper innerside 15a on substantially the line 13a at the extreme bottom innerside of the nipple 13. At least the line 15a should be no higher than the line 13a.

A downturned nipple 16 leads from the underside of the horizontal length 15, having substantially the same internal diameter as that of the elbow 10 throughout its length through the nipple 13, the horizontal length 15, and the nipple 14. Sanitary couplings 17 and 18 detachably interconnect the nipples 13 and 14 respectively to the pipe lines 11 and 12. These couplings 17 and 18 are identical in construction with the coupling 19 which is employed to interconnect the lower end of the nipple 16 with a tubular element 20 carrying on the lower end of it a flapper valve 21 normally held in position closing off the lower end of the element 20 by means of a counter balance weight 22 rocking the valve 21 about a fulcrum hook 23 over which there extends a loop 24 fixed to one side of the valve 21, between it and the weight 22.

While the exact construction of the sanitary couplings 17, 18, and 19 do not enter into the invention per se, to complete the over-all picture, the sanitary coupling 19 is described as having a flat washer 25 intervening between the opposing ends of the nipple 16 and the tubular element 20 with an internal diameter corresponding to that of the nipple 16 and the member 20 so as to leave a smooth interior surface thereacross. A frusto-conical sleeve 26 carries a tapered washer 27 therewithin, dropping downwardly over the tapered end 28 of the lower end portion of the nipple 16. The washer 25 extends outwardly under the members 26 and 27. A coupling body 29 carries a washer 30 therearound fitting between it and the outwardly flared end 31 of the element 20, and a nut 32 screw-threadedly engages outside of the body 29 to draw the members 26 and 29 relatively one toward the other so as to compress the washers 27 and 30 against the tapered ends of the respective tubular members and thus effect a tight connection therearound as well as a compressive engagement against the opposite sides of the intervening washer 25.

During the operation of a milk line, milk is drawn into the line 11 in the direction of the arrow, Fig. 1, under the influence of vacuum pressure applied at the outlet end of the pipe 12. The pipe 11 is generally of a diameter exceeding that which would normally be filled by milk coming from an individual cow milking machine, and therefore unless several machines are operating at the same time, the line 11 will be less than completely filled. However the milk which does enter the pipe line 11 will be carried into the elbow 10 to drop down into the portion 15 which is generally disposed below the bottom of the pipe line 11, filling the nipple 16 and the tubular element 20. Since the entire pipe lines 11 and 12 and the intervening elbow 10 are evacuated, regardless of the weight of the milk resting on the flapper valve 21, the vacuum will be sufficient in accordance with the length of the nipple 16 and the member 20 to retain the flapper valve 21 in its closed, sealed position as indicated in Fig. 1, the dash line representation indicating the valve being opened under weight of milk and at least atmospheric pressure within the pipe lines.

While the pipe line 12 is evacuated, milk will not flow up that line until the horizontal length 15 of the elbow 10 is completely filled, otherwise air is being evacuated from the line 11 across the top of the milk which may be in that section of the elbow so that the milk is not moved. However once the portion 15 is filled completely to its top, the milk will be carried up the pipe 12 continuously if the line 11 is filled, but if it is only partially filled, then the milk in the portion 15 will be carried up the pipe 12 in the nature of a slug, completely filling the diameter of the pipe 12. This slug will be carried on up and out the discharge end of the line 12 (normally turned horizontally at a distance from the elbow 10) so that there is no appreciable runback of milk from the vertical pipe 12 into the portion 15 which would otherwise set up a churning or stirring action in that elbow 10. The next slug will not be carried up the pipe 12 until the portion 15 is again filled.

For example, should the pipe line 11 be filled to the center line AB and not thereabove, and the upper innerside 15a of the horizontal portion of the elbow 10 be above that line, then there will be no milk elevated, although when those two lines approach one another there would be a tendency for the vacuum to lift a part of the milk up the line 12, but not filling the line 12, that milk would run back downwardly and thus set up the churning and splashing action which is to be avoided. Therefore it is indicated that the position of the upper innerside 15a of the portion 15 should be not higher than the lower innerside 13a of the nipple 13.

After the milk flow operation is completed, and it is desired to wash out the milk flow lines, the rinsing and washing fluids are pulled into the pipe 11 and up the pipe 12, through the elbow 10, and when the vacuum is interrupted and the pressure inside comes up to atmospheric, the weight of the fluid in the elbow 10 and down the nipple 16 in the element 20 is sufficient to cause the flapper valve 21 to open to the dash line position at least overcoming the resistance to that movement by the weight 22 and thereby dump the rinsing and washing fluid as the case may be from inside of the elbow 10.

The nipple 16 is preferably offset from the vertical center of the length 15 toward the side of the inlet nipple 13 in order to provide an initial, short horizontal length to the travelling slug of milk after is crosses the opening 35 at the top end of the bottom nipple 16 preliminary to that slug being carried up the nipple 14.

Thus it is to be seen that the problem of securing evacuation of milk from a more or less horizontally disposed pipe line into a rising line without intermixing air in a churning manner has been solved by this simple structure. It is therefore pointed out that while structural changes may be employed in the form herein described, it is desired that the invention not be limited to that precise form beyond the limitations which may be imposed by the following claims.

I claim:

1. The combination with a two part evacuated milk line, having a generally horizontally disposed length and a vertical length of an elbow fitting interconnecting said two lengths and comprising an inlet nipple having an internal diameter substantially equal to that of said horizontal line; an outlet nipple turned upwardly from the opposite end of the elbow of substantially the same internal diameter as that of the inlet nipple; a tubular length extending approximately horizontally between said two nipples; said length being of substantially the same internal diameter as that of both of said nipples and having its axis approximately parallel to the axis of said inlet nipple but spaced therebelow a distance to have its internal upper side on a line not above the line of the inner bottom side of the inlet nipple; said horizontal length filling wtth milk and being evacuated therefrom up said vertical line even though said horizontal line is not completely filled; and means interengaging said horizontal and vertical lines with end portions of said nipples.

2. The combination with a generally horizontally milk flow line and a vertical flow line, of an elbow interconnecting said two lines at the lower end of the vertical flow line and comprising a generally U-shaped tubular member having one leg extending upwardly into connection with the vertical line, and the other leg turned horizontally into connection with the horizontal milk flow line; said tubular part between said legs extending below said horizontal line wherein the upper side of the tubular part is substantially below the underside of said horizontal line, said horizontal tubular part being substantially filled with milk between said vertical flow line and said horizontal line when said horizontal line may be empty; said tubular part having an opening in its under side; a valve normally held closed against that opening; and said outlet being located off the vertical center of said member toward said other leg.

References Cited in the file of this patent

UNITED STATES PATENTS

| 2,302,617 | Little | Nov. 17, 1942 |
| 2,623,513 | Robertson | Dec. 30, 1952 |
| 2,786,445 | Golay | Mar. 26, 1957 |